United States Patent [19]

Whelan

[11] 4,043,958

[45] Aug. 23, 1977

[54] FLAME RETARDED NBR/PVC COMPOSITIONS

[75] Inventor: William Paul Whelan, Woodbury, Conn.

[73] Assignee: Uniroyal, Inc., New York, N.Y.

[21] Appl. No.: 612,146

[22] Filed: Sept. 10, 1975

Related U.S. Application Data

[63] Continuation-in-part of Ser. No. 515,799, Oct. 17, 1974, abandoned.

[51] Int. Cl.$^2$ ................................................ C08K 3/22
[52] U.S. Cl. ...................... 260/2.5 FP; 260/45.75 P; 260/874
[58] Field of Search ................ 260/45.75 P, 881, 897, 260/874, 2.5 FP; 106/15 FP; 252/8.1

[56] References Cited

U.S. PATENT DOCUMENTS

| 2,902,460 | 9/1959 | Jennings et al. | 260/45.75 |
| 3,697,456 | 10/1972 | Pitts et al. | 260/45.75 |
| 3,766,157 | 10/1973 | Parts et al. | 260/45.75 |

FOREIGN PATENT DOCUMENTS

| 808,311 | 12/1973 | Belgium |
| 1,347,704 | 2/1974 | United Kingdom |

*Primary Examiner*—V. P. Hoke
*Attorney, Agent, or Firm*—James J. Long

[57] ABSTRACT

Flame-retarded rubber compositions are disclosed which are economical to produce and which exhibit increased flame-retardance and reduced toxicity. These new compositions comprise acrylonitrile-butadiene rubber, polyvinyl chloride and an iron oxide.

7 Claims, No Drawings

FLAME RETARDED NBR/PVC COMPOSITIONS

This is a continuation-in-part of application Ser. No. 515,799, filed Oct. 17, 1974, now abandoned.

The compatibility, low cost and inherent properties of polyvinyl chloride (PVC) have made it a highly useful modifier for acrylonitrile-butadiene rubber (NBR). A broad range of useful materials based on NBR/PVC blends is known, including both tough, solid rubber compositions and sponged rubbery/resinous compositions having a variety of applications. Solid NBR compositions containing moderate concentrations of PVC exhibit properties similar to those of normally reinforced NBR compounds, but provide greatly improved weathering, ozone and abrasion resistance, and increased resistance to oil, fuel and solvents. Sponged NBR/PVC compositions show high utility in the areas of insulation, flotation and shock absorption.

In addition, while NBR is a flammable rubber, the inherent flame-resistance of PVC has rendered compositions based on NBR/PVC blends suitable for applications where flame-resistance is required, and the compositions have found wide use in these applications. Increasingly stringent flammability regulations, however, have in some instances required an increase in the flame-resistance of the applicable NBR/PVC compositions. The use of antimony trioxide as an additive for further reducing the flammability of halogen-containing rubber compositions is well known, however, antimony trioxide is costly and its use adds materially to the cost of the compositions. Further, this oxide's recent history of limited availability and price instability has shown the hazard of reliance on a single material for this purpose.

Alternatives to the use of antimony trioxide have been reported to be applicable to rubber compositions. Thus, compositions comprising either a natural rubber or a synthetic rubber, such as styrene-butadiene rubber (SBR), a reinforcing black, and a fire-retardant system consisting of a chlorine compound plus calcium borate, zinc borate and iron oxide have been disclosed in Belg. Pat. No. 766,567. Currently, there is no domestic source of the calcium borate required in this system.

As described in application Ser. No. 612,147 of William P. Whelan, Jr., filed simultaneously herewith, polymer compositions containing halogen have been flame-retarded with a variety of metallic compounds including ferrocene, iron naphthenate and ferric acetylacetonate. U.S. Pat. No. 3,766,157 deals with smoke retardant polymer compositions comprising a styrene polymer and sufficient iron 8-hydroxyquinolinate to reduce smoking.

U.S. Pat. No. 3,697,456 teaches the combination of a halogenated organic compound and ferric oxide or other oxides for flame retarding polyurethane foam. These metal oxides are partial, rather than total, replacements for antimony trioxide in polyurethane foam, and are not effective when used as total replacements.

Belgian Pat. No. 808,311 and French Pat. No. 2,236,893 describe the use of ferric oxide and other metallics to suppress smoke from burning polymers. The former describes the use of ferric oxide as a smoke retardant for NBR/PVC blends containing antimony oxide. This patent (p. 3, 11. 22-25) teaches that ferric oxide reduces the smoke generation, but not the flammability, of PVC due to the increased generation of highly flammable hydrocarbon when the oxide is present.

U.S. Pat. No. 2,902,460 discloses the use of iron oxide to impart heat and light stability to compositions comprising a vinyl halide polymer together with an interpolymer of a styrene and acrylonitrile or an alkyl methacrylate.

Heretofore, the need for inexpensive, readily available alternatives to the use of antimony trioxide which are applicable to NBR/PVC blends and comparable to the trioxide in degree of flame-retardant effectiveness has persisted.

It has now been found that oxides of iron, which are both inexpensive and widely available, are highly effective as additives in reducing the flammability of NBR/PVC blends. While these oxides are not effective in reducing the flammability of PVC itself as demonstrated by Oxygen Index tests, it is found surprisingly that NBR/PVC compositions containing up to 200 parts of PVC by weight per 100 parts of NBR are very effectively flame-retarded by such oxides. Moreover, the oxides flame retard these blends far more effectively than analogous blends based on other rubbers such as SBR. No additional fire-retardant agents are required for the effective operation of the oxides in NBR/PVC compositions, although such agents may optionally be employed. The use of antimony oxide in particular is avoided because of its substantial contribution to the cost of the compositions.

The NBR/PVC blends containing an iron oxide in accordance with the practice of this invention, when combined with well-known compounding ingredients such as curatives, provide solid or sponged compositions which are highly useful in such applications as flame-resistant hose, conveyor belts, insulation materials, shock-absorbing materials and the like. The compositions exhibit a degree of flame-resistance which is substantially enhanced by the presence of the iron oxide, and include materials which are rapidly self-extinguishing, without dripping, even in vertical burning tests at low specimen thickness. No additional fire-retardant agents, such as costly antimony trioxide, are required. Utilization of the iron oxides of the invention in particular permits new advantages in cost, raw material availability and low toxicity.

The NBR rubbers employed in the practice of this invention are suitably emulsion copolymers of acrylonitrile with butadiene, wherein all or part of the butadiene may be replaced by isoprene and all or part of the acrylonitrile may be replaced by such monomers as methacrylonitrile, alpha-chloroacrylonitrile, alpha-bromoacrylonitrile and ethacrylonitrile. The polyvinyl chloride is a vinyl chloride homopolymer or copolymer in which the predominant monomer is vinyl chloride. Iron oxides which may be employed include the anhydrous and hydrated forms of ferric oxide and ferrosoferric oxide and mixtures thereof. Additional compounding ingredients which may be employed are well known to the art, having such functions as curative systems, plasticizers, extenders, stabilizers. blowing agents, processing aids and the like.

The iron oxides of this invention are effective flame-retardant additives for NBR/PVC compositions having a PVC content in the range of from 1 to 200 parts by weight per 100 parts of NBR polymer, and such compositions are included within the scope of this invention. For most applications, a PVC content in the range of from 20 to 200 parts will be employed, and most commonly in the range of from 40 to 150 parts. In general, at least about 0.1 part of iron oxide by weight per 100 parts of NBR polymer will be required for a significant increase in flame retardancy, while amounts over 50 parts of iron oxide per 100 parts of NBR offer little advantage. One to 10 parts of iron oxide per 100 parts of NBR is preferred.

The NBR/PVC/ferric oxide compositions of this invention are readily prepared by conventional rubber and plastics compounding techniques, and are converted to finished products by processes well known to the art. However, any techniques may be employed for the combination of the three key ingredients and any auxiliary ingredients, and the resulting compositions are considered to fall within the scope of this invention.

The invention and the preparation of the flame-retarded NBR/PVC compositions will become more clear from the examples below which are set forth as being illustrative of the invention and are not intended to be, nor should they be construed as being, limitative thereof. The NBR/PVC blends of the examples were either commercially available blends, as indicated, or were prepared by blending a mixture of NBR, PVC and PVC-stabilizer for 10 minutes at 350° F. on a two-roll mill, prior to further compounding. The PVC-stabilizer was Thermolite 31, an organotin stabilizer for PVC marketed by M & T Chemicals, Inc.

Compounding of test specimens was carried out in a conventional manner on a rubber/plastics mill. Component concentrations in the examples are shown as parts by weight per 100 parts of NBR. Except where indicated otherwise, all compositions were cured with the following system:

| Zinc Oxide | 5 phr |
|---|---|
| Stearic Acid | 1 phr |
| MBTS | 2.1 phr |
| Monex | 0.4 phr |
| Sulfur | 2.5 phr |

"MBTS" denotes benzothiazyl disulfide and "Monex" is a commercial product containing tetramethylthiuram monosulfide. Slab specimens were compression molded for 30 minutes at 330° F. Moldings were cooled prior to removal from the press. Specimens were cut to size as appropriate to the test method.

The polymers and blends employed were:

Rubber A: an emulsion polymerized acrylonitrile:-butadiene copolymer rubber having 32.5% by weight of acrylonitrile.

Rubber B: an emulsion polymerized acrylonitrile:-butadiene copolymer rubber having 44.4% by weight of acrylonitrile.

Polyvinyl chloride: Marvinol 23, a general purpose resin of medium molecular weight, having an intrinsic viscosity (ASTM D-1243-66) = 0.93, a specific gravity of 1.40 and an oil absorption, cc/gm (ASTM D-281) of 0.9.

Blend I: "Paracril OZO," a 70/30 coprecipitated latex blend of Paracril (butadiene/acrylonitrile) rubber and Marvinol PVC (polyvinyl chloride) resin. Sp. gr. = 1.06; Mooney viscosity, ML-4 at 212° F. = 45-70. From Uniroyal Chemical.

Blend II: "Paracril OZO-50," a 50/50 coprecipitated latex blend of Paracril (butadiene/acrylonitrile) rubber and Marvinol PVC (polyvinyl chloride) resin. Sp. gr. = 1.14. From Uniroyal Chemical.

SBR 1500: a cold-polymerized, non-pigmented, rosin-acid emulsified, salt-acid coagulated, staining, styrene-butadiene rubber of 23.5% target bound styrene, Mooney viscosity (ML 1 + 4) at 212° F. = 52.

Testing of the specimens was carried out as follows:

1. Oxygen Index: ASTM Method D-2863, "Flammability of Plastics Using the Oxygen Index Method." Oxygen Index is the minimum concentration of oxygen, expressed as percent by volume, in a slowly rising mixture of nitrogen and oxygen, that will just support the combustion of a material burning under equilibrium conditions of candlelike burning. Higher "Oxygen Index" indicates decreased relative flammability. In addition, since the method provides a continuous numerical scale for the assignment of relative flammability ratings, it is especially appropriate for illustrating differences in the degree of flame retardation provided by additives.

2. Vertical Burning Test: performance was determined in substantial accordance with Underwritters Laboratories Subject 94 Vertical Burning Test for Classifying Materials 94-V-0, 94-V-1 or 94-V-2. In our laboratories, five 5 inch × ½ inch slab specimens of specified thickness are tested in "as prepared" condition.

EXAMPLE 1

This example illustrates the effectiveness of the iron oxides in reducing the flammability of NBR/PVC blends. ΔOI in the tables represents the increase in the Oxygen Index of the composition provided by the incorporation of the iron oxide.

|     | NBR (100 parts) | PVC, parts | Ferric Oxide, parts | Ferrosoferric Oxide, parts | Oxygen Index | ΔOI |
|---|---|---|---|---|---|---|
| (a) | Rubber A | — | — | — | 19.3 | — |
| (b) | Rubber A | — | 1 | — | 19.0 | ~0 |
| (c) | Rubber A | 1 | — | — | 19.4 | — |
| (d) | Rubber A | 1 | 0.2 | — | 19.8 | +0.4 |
| (e) | Rubber A | 1 | 1 | — | 19.8 | +0.4 |
| (f) | Rubber A | 20 | — | — | 22.9 | — |
| (g) | Rubber A | 20 | 4.2 | — | 25.8 | +2.9 |
| (h) | Rubber A | 43 | — | — | 25.8 | — |
| (i) | Rubber A | 43 | 5 | — | 28.6 | +2.8 |
| (j) | (Blend I: 100 NBR / 43 PVC) | | 1 | — | 26.7 | +0.9 |
| (k) | (Blend I: 100 NBR / 43 PVC) | | 5 | — | 28.6 | +2.8 |
| (l) | (Blend I: 100 NBR / 43 PVC) | | 10 | — | 29.8 | +4.0 |
| (m) | (Blend II: 100 NBR / 100 PVC) | | — | — | 29.3 | — |
| (n) | (Blend II: 100 NBR / 100 PVC) | | 2.5 | — | 31.3 | +2.0 |
| (o) | (Blend II: 100 NBR / 100 PVC) | | 5 | — | 32.8 | +3.5 |
| (p) | (Blend II: 100 NBR / 100 PVC) | | 10 | — | 35.9 | +6.6 |
| (q) | Rubber A | 200 | — | — | 37.0 | — |
| (r) | Rubber A | 200 | 5 | — | 41.5 | +4.5 |
| (s) | Rubber A | 200 | 10 | — | 39.2 | +2.2 |
| (t) | Rubber A | 200 | 50 | — | 39.6 | +2.6 |

-continued

| | NBR (100 parts) | PVC, parts | Ferric Oxide, parts | Ferrosoferric Oxide, parts | Oxygen Index | ΔOI |
|---|---|---|---|---|---|---|
| (u) | Rubber A | 300 | — | — | 41.2 | — |
| (v) | Rubber A | 300 | 10 | — | 41.3 | ~0 |
| (w) | None | 100* | — | — | 48.3 | — |
| (x) | None | 100* | 1 | — | 45.3 | −3.0 |
| (y) | None | 100* | 42 | — | 41.2 | −7.1 |
| (z) | Rubber B | 20 | — | — | 24.0 | — |
| (aa) | Rubber B | 20 | 5 | — | 27.6 | +3.6 |
| (bb) | Rubber B | 20 | — | 5 | 25.0 | +1.0 |

*Stabilized with Thermolite 31; no curatives; molded at 340° F.

In contrast to the ineffectiveness of the iron oxide as a flame retardant in the absence of PVC, as shown by (b), the oxide is effective at PVC concentrations ranging from 1 to 200 parts by weight per 100 parts of NBR, as shown by (c) through (t). At higher PVC concentrations or in the absence of NBR ((u) through (y)), the oxide is ineffective. The equivalence of the commercial and the prepared NBR/PVC blends is shown by a comparison of (i) and (k).

Additional examples (z) through (bb) illustrate that the oxide is effective with NBR rubbers of both low and high acrylonitrile content and that ferrosoferric oxide exerts a flame-retardant effect similar to, although lesser than, that of ferric oxide.

A comparison of the effectiveness of the iron oxide and an equal weight of antimony trioxide in representative compositions is provided in the table below:

| | NBR/PVC (parts) | Oxide Additive (parts) | Oxygen Index | ΔOI |
|---|---|---|---|---|
| (1) | Blend I (100/43) | Ferric Oxide (10) | 29.8 | +4.0 |
| (cc) | Blend I (100/43) | Antimony Trioxide (10) | 29.4 | +3.6 |
| (p) | Blend II (100/100) | Ferric Oxide (10) | 35.9 | +6.6 |
| (dd) | Blend II (100/100) | Antimony Trioxide (10) | 35.2 | +5.9 |

The data show the iron oxide to be comparable or superior to the costlier antimony trioxide in flame-retardant effectiveness.

The following data show that in contrast to its effectiveness in NBR/PVC blends, the iron oxide is ineffective when the rubber component is SBR:

| | Rubber (100 parts) | PVC, parts | Ferric Oxide, parts | Oxygen Index | ΔOI |
|---|---|---|---|---|---|
| (g) | Rubber A | 20 | 4.2 | 25.8 | +2.9 |
| (ee)* | SBR 1500 | 20 | 4.2 | 19.8 | −0.6 |

*Prepared in the same manner; stabilized with Thermolite 31; cured with the system (parts): zinc oxide (5), stearic acid (1), MBT (0.5), Monex (1.5), sulfur (1.5). "MBT" denotes mercaptobenzothiazole.

Compositions (m) and (p) were also subjected to vertical burning tests with the following results:

| | NBR/PVC (parts) | Ferric Oxide parts | UL-94V* |
|---|---|---|---|
| (m) | Blend II (100/100) | — | Failed[a] |
| (p) | Blend II (100/100) | 10 | 94-V-O[b] |

*1/8" thick specimens.
[a]4 of 5 specimens burned to completion, with dripping of flaming material.
[b]All 5 specimens extinguished within 10 seconds following each application of the test flame, with no dripping, and with an average burning time of 4.5 seconds.

As shown, in contrast to the failure of the parent composition (m), the iron oxide composition (p) provided the highest performance category obtainable in the test.

EXAMPLE 2

Sponged NBR/PVC compositions were prepared by the procedure described, with the following modifications:

a. Ten parts by weight of Celogen AZ 130 (blowing agent) and five parts by weight of Paraplex G-62 (stabilizer) per 100 parts of NBR were additionally incorporated during compounding;

b. compression molding was carried out at 300° F.;

c. after removal from the press, moldings were heated for 60 minutres in a 180° C. oven.

Celogen AZ 130 is azodicarbonamide, sp. gr. = 1.63; average particle is 3.0 microns. From Uniroyal Chemical.

Paraplex G-62 is epoxidized soybean oil, freezing point, +5° C.; molecular weight = 1000; sp. gr. = 0.993 at 25° C.; viscosity = 3.5 poise at 25° C.; refractive index = 1.471 at 25° C.

The comparative test data given in the table below show that the iron oxide is an effective flame retardant in sponged NBR/PVC compositions.

| | NBR/PVC (parts) | Ferric Oxide, parts | Sponge Density (gr/cc) | Oxygen Index | ΔOI |
|---|---|---|---|---|---|
| (a) | Blend I (100/43) | — | 0.17 | 21.4 | — |
| (b) | Blend I (100/43) | 10 | 0.09 | 24.3 | +2.9 |

In general, the compositions of this invention can be converted to give a flame resistant sponge formulation by adding 25 to 100 pph of dioctyl phthalate or similar plasticizer, 0 to 150 pph of filler such as calcium carbonate, and 10 to 40 pph of "Celogen AZ" or other blowing agent and curing for about 30 minutes at about 330° F. The resultant sponge has a density in the range of about 3 to 20 lbs. per cubic foot and exhibits different degrees of flame resistance up to "non-burning" category.

What is claimed is:

1. A composition comprising a rubber prepared from a diene selected from the group consisting of butadiene, isoprene and mixtures thereof and from a nitrile selected from the group consisting of acrylonitrile, methacrylonitrile, alpha-chloroacrylonitrile, alpha-bromoacrylonitrile and mixtures thereof and: (a) from 1 to 200 parts by weight per 100 parts by weight of said rubber of polyvinyl chloride; and (b) from 0.1 to 50 parts by weight per 100 parts by weight of said rubber of an iron oxide selected from the group consisting of the anhydrous and hydrated forms of ferric oxide and ferrosoferric oxide and mixtures thereof.

2. A composition comprising an acrylonitrile-butadiene rubber and: (a) from 1 to 200 parts by weight per 100 parts by weight of said rubber of polyvinyl chloride; and (b) from 0.1 to 50 parts by weight per 100 parts by weight of said rubber of an iron oxide selected from the group consisting of the anhydrous and hydrated forms of ferric oxide and ferrosoferric oxide and mixtures thereof.

3. The composition of claim 2 in which said iron oxide is ferric oxide.

4. The composition of claim 2 in which said iron oxide is ferrosoferric oxide.

5. The composition of claim 2 in which said iron oxide is a mixture of iron oxides consisting of ferric oxide and ferrosoferric oxide.

6. The composition of claim 2 in which said polyvinyl chloride is present in an amount of from 40 to 150 parts by weight per 100 parts by weight of said rubber, and said iron oxide is present in an amount of from 1 to 10 parts by weight per 100 parts by weight of said rubber.

7. A sponged composition comprising an acrylonitrile-butadiene rubber and: (a) from 1 to 200 parts by weight per 100 parts by weight of said rubber of polyvinyl chloride; and (b) from 0.1 to 50 parts by weight per 100 parts by weight of said rubber of an iron oxide selected from the group consisting of the anhydrous and hydrated forms of ferric oxide and ferrosoferric oxide and mixtures thereof.

* * * * *

UNITED STATES PATENT AND TRADEMARK OFFICE
CERTIFICATE OF CORRECTION

PATENT NO. : 4,043,958
DATED : August 23, 1977
INVENTOR(S) : WILLIAM PAUL WHELAN It is certified that error appears in the above-identified patent and that said Letters Patent are hereby corrected as shown below:

Column 6, line 59, for "trile and" read -- trile, ethacrylonitrile and -- .

Signed and Sealed this

Fifteenth Day of August 1978

[SEAL]

Attest:

RUTH C. MASON
Attesting Officer

DONALD W. BANNER
Commissioner of Patents and Trademarks